(12) United States Patent
Uchida et al.

(10) Patent No.: US 11,130,312 B2
(45) Date of Patent: Sep. 28, 2021

(54) ELECTRICAL WIRE AND WIRE HARNESS USING THE SAME

(71) Applicants: YAZAKI CORPORATION, Tokyo (JP); The University of Tokyo, Tokyo (JP)

(72) Inventors: Youhei Uchida, Shizuoka (JP); Hideo Gonda, Shizuoka (JP); Junichirou Tokutomi, Shizuoka (JP); Jun Yanagimoto, Tokyo (JP)

(73) Assignees: YAZAKI CORPORATION, Tokyo (JP); The University of Tokyo, Tokyo (JP)

( * ) Notice: Subject to any disclaimer, the term of this patent is extended or adjusted under 35 U.S.C. 154(b) by 125 days.

(21) Appl. No.: 15/895,332

(22) Filed: Feb. 13, 2018

(65) Prior Publication Data

US 2018/0233247 A1 Aug. 16, 2018

(30) Foreign Application Priority Data

Feb. 14, 2017 (JP) .............................. JP2017-024842

(51) Int. Cl.
*H01B 1/02* (2006.01)
*B32B 15/20* (2006.01)
*C08K 3/04* (2006.01)

(52) U.S. Cl.
CPC .............. *B32B 15/20* (2013.01); *C08K 3/041* (2017.05); *B32B 2307/202* (2013.01)

(58) Field of Classification Search
CPC ........ C22C 49/01; H01B 1/02; H01B 7/0045; H01B 1/023; H01B 1/04
See application file for complete search history.

(56) References Cited

U.S. PATENT DOCUMENTS

RE27,830 E * 12/1973 Schoerner ............... C22C 21/00
 174/128.1
8,831,389 B2 9/2014 McCullough et al.
(Continued)

FOREIGN PATENT DOCUMENTS

CN 102473483 A 5/2012
CN 102714073 A 10/2012
(Continued)

OTHER PUBLICATIONS

The office action dated May 21, 2019 in a counterpart Japanese patent application.
(Continued)

*Primary Examiner* — Cheng Yuan Huang
(74) *Attorney, Agent, or Firm* — Metrolex IP Law Group, PLLC

(57) ABSTRACT

An electrical wire includes an aluminum element wire that has an aluminum base material and carbon nanotubes dispersed in the aluminum base material, in which the aluminum element wire has an electrical conductivity of 62% IACS or more and a tensile strength of 130 MPa or more. The aluminum base material is a polycrystal having a plurality of aluminum crystal grains. Further, a carbon nanotube conductive path, which is composed of the carbon nanotube, and forms a conductive path allowing electricity to conduct therethrough in a longitudinal direction of the aluminum element wire by being present in a part of grain boundaries between the plurality of aluminum crystal grains in a transverse cross section of the aluminum base material, and being present along the longitudinal direction of the aluminum element wire, is formed in the aluminum base material.

6 Claims, 8 Drawing Sheets

(56) References Cited

U.S. PATENT DOCUMENTS

| | | | |
|---|---|---|---|
| 8,957,312 B2 | 2/2015 | McCullough et al. | |
| 9,093,194 B2 | 7/2015 | McCullough et al. | |
| 9,362,022 B2 | 6/2016 | Kamiyama et al. | |
| 2003/0163917 A1* | 9/2003 | Davidshofer | B60R 16/0207 |
| | | | 29/854 |
| 2012/0163758 A1 | 6/2012 | McCullough et al. | |
| 2012/0168199 A1 | 7/2012 | McCullough et al. | |
| 2012/0267141 A1 | 10/2012 | Kamiyama et al. | |
| 2012/0298403 A1 | 11/2012 | Johnson et al. | |
| 2014/0225042 A1* | 8/2014 | In | H01B 1/02 |
| | | | 252/503 |
| 2014/0311769 A1* | 10/2014 | In | C22C 5/06 |
| | | | 174/126.2 |
| 2014/0345906 A1 | 11/2014 | McCullough et al. | |
| 2015/0325337 A1 | 11/2015 | McCullough et al. | |
| 2016/0251225 A1* | 9/2016 | Takai | C01B 32/178 |
| | | | 428/402 |
| 2017/0018324 A1 | 1/2017 | Tokutomi et al. | |

FOREIGN PATENT DOCUMENTS

| | | |
|---|---|---|
| CN | 202502766 U | 10/2012 |
| CN | 102834876 A | 12/2012 |
| JP | 2004-131758 A | 4/2004 |
| JP | 2005-048206 A | 2/2005 |
| JP | 4409872 B2 | 2/2010 |
| JP | 5683974 B2 | 3/2015 |
| JP | 2015-176733 A | 10/2015 |
| JP | 2015-199982 A | 11/2015 |

OTHER PUBLICATIONS

The office action issued on Mar. 29, 2019 in a counterpart Chinese patent application.

* cited by examiner

ELECTRICAL WIRE AND WIRE HARNESS USING THE SAME

CROSS REFERENCE TO RELATED APPLICATION

This application is based upon and claims the benefit of priority from the prior Japanese Patent Application No. 2017-024842, filed on Feb. 14, 2017, the entire contents of which are incorporated herein by reference.

BACKGROUND

1. Technical Field

The present invention relates to an electrical wire and a wire harness using the same. Particularly, the present invention relates to an electrical wire capable of achieving high conductive properties and strength and a wire harness using the electrical wire.

2. Background Art

Conventionally, as a method for enhancing strength of a metal material, there has been performed a method of mixing a second metal, which is different from a base metal of the metal material, with the metal material. However, there is a problem that the conductive properties of the metal material decrease to a large extent when the metal material is mixed with the second metal.

Accordingly, a carbon nanotube composite material obtained by complexing a metal material with carbon nanotubes (CNT) attracts attention. A carbon nanotube has high strength and performs ballistic conduction, and accordingly, it is expected that the strength and conductive properties thereof will be enhanced in comparison with those of the metal material. At present, a variety of carbon nanotube composite materials are proposed.

For example, Japanese Patent No. 5683974 discloses a wire rod obtained by using a composite material in which carbon nanotubes are dispersed in an aluminum material. The wire rod has a cellulation structure including: a wall portion containing a carbon nanotubes; and an inside portion of the wall which is surrounded by the wall portion and which comprises an aluminum material or the like. In this wire rod, the compounding ratio of the carbon nanotube to the aluminum material is from 0.2 wt % to 5 wt %.

The wire rod described in Japanese Patent No. 5683974 is obtained by the following step.

First, a mixture, which contains an aluminum powder, the carbon nanotube, and elastomer, is subjected to heat treatment, whereby the elastomer is vaporized to obtain a porous body. Next, the porous body is subjected to plasma sintering in a can, and a billet is fabricated. Further, this billet is subjected to extrusion molding, and is annealed at 500° C., whereby the wire rod is obtained.

SUMMARY

However, the wire rod described in Japanese Patent No. 5683974 has had a problem that the electrical conductivity thereof is lower than that of aluminum, i.e., a pure metal. This is considered to be because an oxide film is formed on a surface of each particle of the aluminum powder to increase electrical resistance of the wire rod, and because an air gap in the porous body or the billet remains as a void in the wire rod. Further, the wire rod described in. Japanese Patent No. 5683974 has had a problem that a residue, which is generated in an event of vaporizing the elastomer, remains on a surface of the wire rod, thus making it easy to decrease the electrical conductivity of the wire rod. In other words, an exclusive event occurs such that the carbon nanotube is used in order to increase the strength, whereby the electrical conductivity thereof becomes equal to or less than that of pure aluminum, meanwhile, in order to increase the electrical conductivity, the strength is decreased. Accordingly, the electrical conductivity of the case of the wire rod of Japanese Patent No. 5683974 does not largely exceed the electrical conductivity of pure aluminum, and thus it has been difficult to apply the e rod to an electrical wire and a wire harness for automobiles.

The present invention has been made in view of the problem of the conventional technology. An object of the present invention is to provide an electrical wire capable of exhibiting an electrical conductivity higher than that of pure aluminum and having strength equal to or higher than that of pure aluminum and a wire harness using the electrical wire.

An electrical wire according to a first embodiment of the present invention includes an aluminum element wire having an aluminum base material and a carbon nanotube dispersed in the aluminum base material, and the aluminum element wire has an electrical conductivity of 62% IACS or more and a tensile strength of 130 MPa or more.

An electrical wire according to a second embodiment of the present invention relates to the electrical wire according to the first embodiment, and the aluminum base material is a polycrystal having a plurality of aluminum crystal grains. Further, a carbon nanotube conductive path, which is composed of the carbon nanotube, and forms a conductive path allowing electricity to conduct therethrough in a longitudinal direction of the aluminum element wire by being present in a part of grain boundaries between the plurality of aluminum crystal grains in a transverse cross section of the aluminum base material, and being present along the longitudinal direction of the aluminum element wire, is formed in the aluminum base material.

An electrical wire according to a third embodiment of the present invention relates to the electrical wire according to the first or second embodiment. In the aluminum element wire, a content of carbon nanotubes with respect to the aluminum base material is from 0.1 mass % to 1.25 mass %.

An electrical wire according to a fourth embodiment of the present invention relates to the electrical wire according to any one of the first to third embodiments and further includes a coating material for covering the peripheral edge of the aluminum element wire, and the coating material has a volume resistivity of $10^9 \Omega \cdot mm$ or more.

A wire harness according to a fifth embodiment of the present invention includes the electrical wire according to any one of the first to fourth embodiments.

With regard to the electrical wire of the present invention, the conductive paths are formed by dispersing carbon nanotubes in the aluminum base material. Consequently, it is possible to obtain an electrical wire and a wire harness which have an electrical conductivity higher than that of pure aluminum and also has the strength equal to or greater than that of pure aluminum.

DETAILED DESCRIPTION

Hereinafter, the electrical wire according to each of the embodiments of the present invention and a wire harness using the electrical wire will be described in detail with reference to the drawings. Note that the dimension ratio of each drawing is exaggerated for the sake of explanation, and may differ from an actual ratio.

[Aluminum Element Wire]

Figure 1:
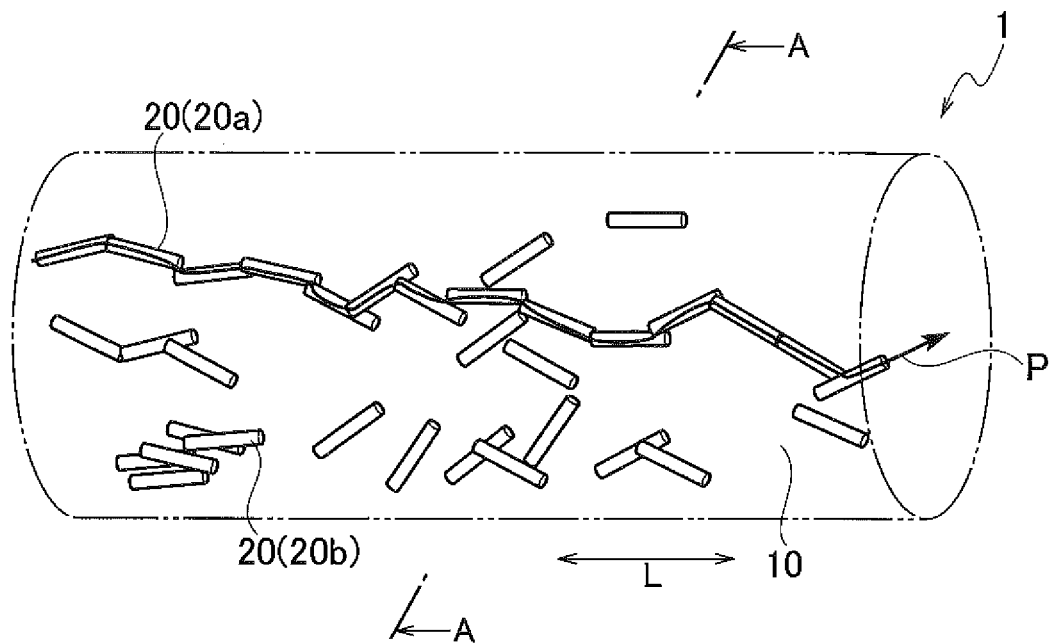
FIG. 1 is a perspective view schematically illustrating a part of an aluminum element wire according to an embodiment of the present invention.

The electrical wire according to each of the embodiments of the present invention has an aluminum element wire 1 as illustrated in FIG. 1. The aluminum element wire 1 is a wire rod that extends in a longitudinal direction L, and FIG. 1 illustrates only a part of the aluminum element wire 1.

The aluminum element wire 1 of the embodiment has an aluminum base material 10 and carbon nanotubes dispersed in the aluminum base material 10. The aluminum base material 10 includes a polycrystal having a plurality of aluminum crystal grains 11. It is preferable that at least a part of the aluminum base material 10 is composed of the polycrystal, and it is more preferable that a whole of the aluminum base material 10 is composed of the polycrystal.

It is preferable that the aluminum crystal grains 11 are composed of pure aluminum with a purity of 99.7 mass % or more. As the pure aluminum, a preferably used one is an aluminum metal with an Al purity of 99.70 or more among aluminum ingots specified in Japanese Industrial Standards JIS H2102 (Aluminum Ingots for remelting). Specific examples thereof include A199.70, A199.94, A199.97, A199.98, A199.99, A199.990 and A199.95 with a purity of 99.7 mass % or more. In the embodiment, not only an expensive and highly pure aluminum ingots like A199.995, but also a reasonably priced pure aluminum with a purity of 99.7 mass % or more may be used.

The aluminum crystal grains 11 may contain an infinitesimal amount of inevitable impurities. Examples of the inevitable impurities which can be contained in the aluminum crystal grains 11 include iron (Fe), silicon (Si), copper (Cu), gallium (Ga), zinc (Zn), boron (B) mar (Yin), lead (Pb) calcium (Ca), and cobalt (Co). These impurities are inevitably contained in a range that does not impair the effect of the embodiment and does not remarkably affect the characteristics of the aluminum element wire of the embodiment. Further, the term "inevitable impurities" used herein includes an element originally contained in a pure aluminum ingot to be used. The total amount of the inevitable impurities in the aluminum crystal grains 11 is preferably 0.15 mass % or less and more preferably 0.12 mass % or less. Further, the inevitable impurities may be dissolved or precipitated in the aluminum crystal grains.

In the aluminum element wire 1, the average crystal grain size of the aluminum crystal grains 11 is preferably from 0.1 µm to 100 µm, more preferably from 1 µm to 50 µm, and still more preferably from 1 µm to 10 µm. Further, when either the longitudinal cross section or transverse cross section of the aluminum element wire 1 is observed, the average Crystal grain size of the aluminum crystal grains 11 is preferably from 0.1 µm to 100 µm, more preferably from 1 µm to 50 µm, and still more preferably from 1 µm to 10 µm. The average crystal grain size of the aluminum crystal grains 11 is within the range, whereby the carbon nanotube tends to be dispersed at the grain boundaries 15 of the aluminum crystal grains 11. Thus, the strength of the aluminum element wire can be increased by a dispersion-strengthening mechanism. Further, carbon nanotube conductive paths 20 to be described below are easily formed at the grain boundaries 15 of the aluminum crystal grains 11 so that it is possible to increase the electrical conductivity the aluminum element wire 1. Note that the longitudinal cross section of the aluminum element wire 1 is a cross section obtained by cutting the aluminum element wire 1 along the longitudinal direction L thereof. The traverse cross section of the aluminum element wire 1 is a cross section obtained by cutting the aluminum element wire 1 along a plane perpendicular to the longitudinal direction L thereof. The average crystal grain size of the aluminum crystal grains 11 can be determined by observing the cross section of the aluminum element wire 1 with a scanning electron microscope or a transmission electron microscope and performing the cutting method specified in JIS H0501 (methods for estimating average grain size of wrought copper and copper alloys, ISO 2624).

Figure 2:
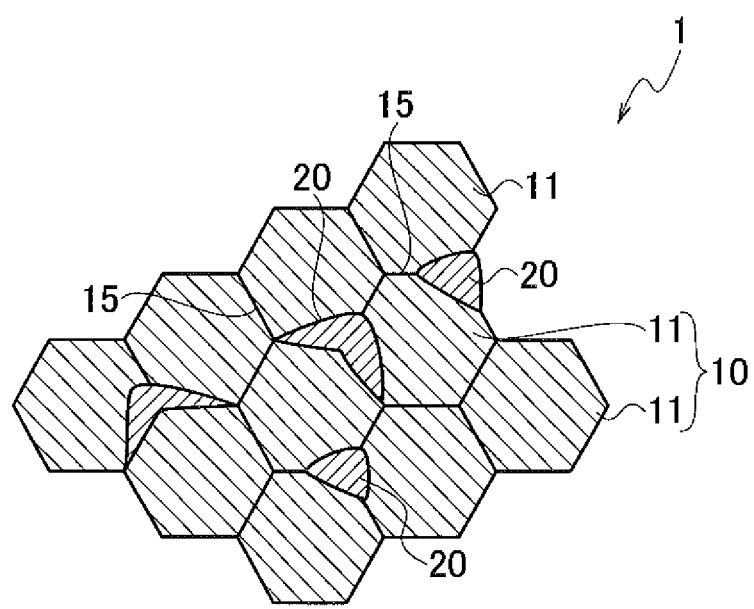
FIG. 2 is a cross-sectional view schematically illustrating a part of a section along the line A-A of FIG. 1.

In the aluminum element wire 1, the cross-sectional shape of the aluminum crystal grains 11 is not particularly limited. In FIG. 2, the cross-sectional shape of the aluminum crystal grains 11 is illustrated as a hexagonal shape, and the cross-sectional shape of the aluminum crystal grains 11 may be any shape other than the hexagonal shape.

As described above, the aluminum element wire 1 according to the embodiment has the aluminum base material 10 and the carbon nanotubes dispersed in the aluminum base material 10 Specifically, as illustrated in FIG. 2, the carbon nanotube conductive paths 20 composed of carbon nanotubes are present at a part of the grain boundaries 15 of the aluminum crystal grains 11. A plurality of the carbon nanotube conductive paths 20 is formed in the aluminum element wire 1.

The carbon nanotube conductive paths 20 are composed of carbon nanotubes and form conductive paths P which allow electricity to conduct therethrough in the longitudinal direction L of the aluminum base material 10. The carbon nanotube conductive path 20 is composed of one or more carbon nanotubes. As each of the carbon nanotubes which compose the carbon nanotube conductive path 20, one or two or more carbon nanotubes may be present in an extended state, or one or two or more carbon nanotubes may be aggregated in a massive form.

As the carbon nanotubes which compose the carbon nanotube conductive paths 20, any known carbon nanotubes may be used. The carbon nanotube may be a single-wall nanotube (SWNT, single layer) or a multi-wall nanotube (MWNT, multi-layer). The diameter of the carbon nanotube is preferably from 0.4 nm to 50 nm, and the average length of the carbon nanotube is preferably 10 μm or more.

When the carbon nanotube is measured by Raman spectroscopic analysis, characteristic peaks derived from lattice vibration, such as a D band at around 1300 $cm^{-1}$, a G band at around 1590 $cm^{-1}$, and a G' band at around 2700 $cm^{-1}$, appear in the Raman spectrum. The G band is derived from the in-plane stretching vibration of a six-membered ring structure in a graphite structure, and the D band is derived from a defect structure thereof. The intensity ratio between the G band and D band (G/D ratio) is an indicator showing the proportion of crystals in the carbon nanotube. Since the less defects and the higher crystallinity the carbon nanotube has in the graphite structure, the more excellent the conductive properties and tensile strength are, and thus the G/D ratio is preferably larger. Accordingly, the G/D ratio of the carbon nanotubes which se the carbon nanotube conductive paths 20 is preferably 5 or more.

As illustrated in FIG. 2, the carbon nanotube conductive path 20 is present at a part of the grain boundaries 15 between the aluminum crystal grains 11 in the transverse cross section of the aluminum base material 10. In other words, in the transverse cross section of the aluminum base material 10, the carbon nanotube conductive path 20 is not present at the whole of the grain boundaries 15 of the aluminum crystal grains 11. Thus, the carbon nanotube conductive path 20 does not have a structure that surrounds the aluminum crystal grains 11. Further, as illustrated in FIG. 2, when a plurality of the carbon nanotube conductive paths 20 is present, the carbon nanotube conductive paths 20 are usually spaced apart from one another.

Note that the conventionally known aluminum element wire is an aluminum element wire having a so-called cellulation structure in which a carbon nanotube conductive path covers the whole periphery of an aluminum crystal grain. The cellulation structure is a structure in which the aluminum crystal grain is included in a cell formed by the carbon nanotube conductive path. Usually, the cellulation structure is composed of a plurality of the cells and has a honeycomb structure in which two adjacent cells are connected so as to have a shared wall surface. In the cellulation structure, the carbon nanotube conductive paths are present at the whole of the grain boundaries between the aluminum crystal grains.

Meanwhile, in the case of the aluminum element wire 1 according to the embodiment, in the transverse cross section of the aluminum base material 10, the carbon nanotube conductive paths 20 are present at a part of the grain boundaries 15 between the aluminum crystal grains 11, and is not present at the whole of the grain boundaries 15. Thus, the aluminum element wire 1 according to the embodiment has a clearly different structure from the cellulation structure since the carbon nanotube conductive paths 20 do not form a cell which surrounds the aluminum crystal grains 11.

As illustrated in FIG. 1, the carbon nanotube conductive paths 20 are present along the longitudinal direction L of the aluminum base material 10, thereby forming the conductive paths P which allow electricity to conduct therethrough in the longitudinal direction of the aluminum base material 10. Note that, in the aluminum element wire 1, the carbon nanotube conductive paths 20 are present continuously, intermittently, or both continuously and intermittently along the longitudinal direction L of the aluminum base material 10.

For example, in FIG. 1, carbon nanotube conductive paths 20a are present continuously along the longitudinal direction L. Here, that the carbon nanotube conductive paths are present continuously stands for that the carbon nanotube conductive paths 20 adjacent to one another in the longitudinal direction L contact one another. In FIG. 1, the carbon nanotube conductive paths 20b are present intermittently along the longitudinal direction L. Here, that the carbon nanotube conductive paths are present intermittently stands for that the carbon nanotube conductive paths 20 adjacent to one another in the longitudinal direction L do not contact one another.

Note that, with regard to the carbon nanotube conductive paths 20, at least a part of the carbon nanotube conductive paths 20 may be present along the longitudinal direction L of the aluminum base material 10. Therefore, it is not necessary that all of the carbon nanotube conductive paths 20 should be present along the longitudinal direction L of the aluminum base material 10. For example, in the aluminum element wire 1 according to the embodiment, an orientation direction of a part of the carbon nanotube conductive paths 20 does not have to go along the longitudinal direction L of the aluminum base material 10. In this case, an orientation direction of the carbon nanotube conductive paths 20 in the aluminum element wire 1 becomes random.

As described above, in the aluminum element wire 1 according to the embodiment, the carbon nanotube conductive paths 20 are not necessarily present continuously along the longitudinal direction L of the aluminum base material 10. However, since the aluminum base material 10 itself has conductive properties, it is possible to make conduction through the aluminum base material 10 even if the carbon nanotube conductive paths 20 are spaced apart from one another.

In the aluminum element wire 1, a content of carbon nanotubes with respect to the aluminum base material 10 is preferably from 0.1 mass % to 1.25 mass %. When the content of carbon nanotubes is within the range, the carbon nanotube conductive paths 20 are easily formed, and thus it is possible to obtain the aluminum element wire 1 whose electrical conductivity and strength are higher than those of an element wire composed only of pure aluminum. Note that, from the viewpoint of further improving the electrical conductivity, the content of carbon nanotubes with respect to the aluminum base material 10 is more preferably from 0.25 mass % to 0.75 mass %.

It is preferable that the carbon nanotube conductive paths 20 formed at grain boundaries 15 of the aluminum crystal grains 11 have a thickness of from 2 nm to 10 μm. Further, when either the longitudinal cross section or the transverse cross section of the aluminum element wire 1 is observed, the thickness of the carbon nanotube conductive paths 20 is more preferably from 2 nm to 10 µm. When the thickness of the carbon nanotube conductive paths 20 is within the range, it is easy to form the conductive paths P along the longitudinal direction L of the aluminum element wire 1 and thus the conductive properties of the aluminum element wire 1 can be effectively improved. Note that the thickness of the carbon nanotube conductive paths 20 can be measured by observing the longitudinal cross section or the transverse cross section of the aluminum element wire 1 with a scanning electron microscope (SEM) or a transmission electron microscope (TEM).

It is preferable that the aluminum element wire 1 according to the embodiment has an electrical conductivity of 62% IACS or more and a tensile strength of 130 MPa or more. In the aluminum element wire 1, the carbon nanotube conductive paths 20 are formed by complexing highly crystalline carbon nanotubes with pure aluminum. Thus, it is possible that the aluminum element wire 1 has an electrical conductivity higher than that of pure aluminum and also has the strength equal to or greater than that of pure aluminum. Note that the electrical conductivity of the aluminum element wire 1 can be measured in accordance with Japanese Industrial Standards: JIS C2525 (Testing method for conductor-resistance and resistivity of metallic resistance materials). The tensile strength of the aluminum element wire 1 can be measured in accordance with JIS Z2241 (Metallic materials-Tensile testing-Method of test at room temperature; Corresponding International Standard ISO 6892-1:2009).

[Method of Manufacturing Aluminum Element Wire]

Subsequently, the method of manufacturing the aluminum element wire 1 according to the embodiment will be described. The method of manufacturing the aluminum element wire 1 includes a CNT dispersing step, a step of uniformly attaching CNT to the surface of an aluminum powder, and a complexing step.

(CNT Dispersing Step)

The CNT dispersing step is a step of highly dispersing carbon nanotubes in a solvent. The solvent which disperses the carbon nanotubes is not particularly limited, and it is preferable to use an organic solvent.

As the organic solvent, anyone of the following solvents may be used: an alcoholic solvent, an amide solvent, a ketone solvent, and a mixed solvent of a combination of any of the alcoholic solvent, ketone solvent and amide solvent. The alcoholic solvent to be used may be at least one selected from the group consisting of methanol, ethanol, 1-propanol, 2-propanol, 1-butanol, 2-methyl-1-propanol, 2-butanol and 1-methyl-2-propanol. The amide solvent to be used may be at least one selected from the group consisting of N,N-dimethylformamide, N-methylpyrrolidone, dimethylsulfoxide and dimethylacetamide. Further, the ketone solvent to be used may be at least one of acetone and methyl ethyl ketone.

As the carbon nanotubes, the above carbon nanotubes may be used. Further, the carbon nanotubes may be previously washed with an acid in order to remove a metal catalyst such as platinum or amorphous carbon or may be graphitized by previous high temperature processing. The carbon nanotubes are subjected to previous high temperature processing so that the carbon nanotubes can be highly purified or crystallized.

Figure 3A:
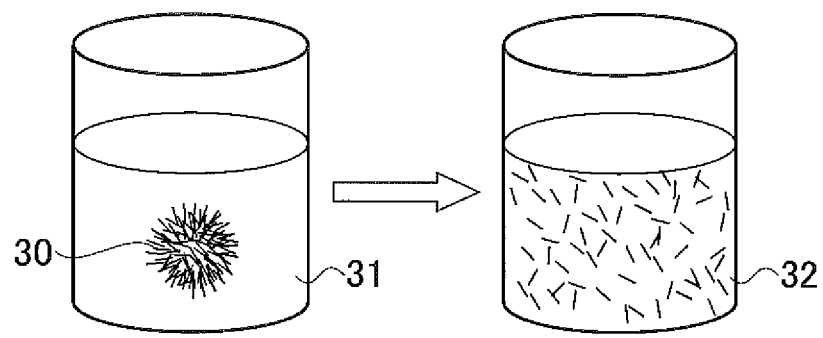
FIG. 3A is schematic view for describing a step of manufacturing the aluminum element wire according to the embodiment of the present invention.

The method of highly dispersing carbon nanotubes in the solvent is not particularly limited. As illustrated in FIG. 3A, carbon nanotubes 30 are added to a solvent 31 and the resulting mixture is stirred at high speed, whereby the carbon nanotubes 30 are dispersed. Note that, in order to disperse the carbon nanotubes 30 efficiently, external forces such as ultrasonic waves may be applied to the resulting mixture after adding the carbon nanotubes 30 to the solvent 31. The step allows the carbon nanotubes 30 to dissolve, whereby a CNT dispersion 32 highly dispersed in the solvent 31 is obtained.

(Step of Uniformly Attaching CNT)

In the step of uniformly attaching CNT, it is preferable that the surface of the aluminum powder is almost uniformly covered with carbon nanotubes, thereby allowing the carbon nanotubes to be in the form of a net. Specifically, the aluminum powder is first added to the CNT dispersion 32 obtained in the CNT dispersing step. The aluminum powder to be used is preferably a powder composed of the pure aluminum with a purity of 99.7 mass % or more. The average particle diameter (D50) of the aluminum powder is preferably from 1 µm to 500 µm, more preferably from 3 µm to 300 µm, and still more preferably from 3 µm to 50 µm. Under such conditions, it is possible to control the average crystal grain size of the aluminum crystal grains 11 in the aluminum element wire 1 in the above range. Note that the average particle diameter of the aluminum powder can be measured by the laser diffraction/scattering method.

In the aluminum element wire 1, the amount of the aluminum powder to be added to the CNT dispersion 32 is preferably adjusted so that the content of carbon nanotubes with respect to the aluminum base material 10 is from 0.1 mass % to 1.25 mass %.

Figure 3B:
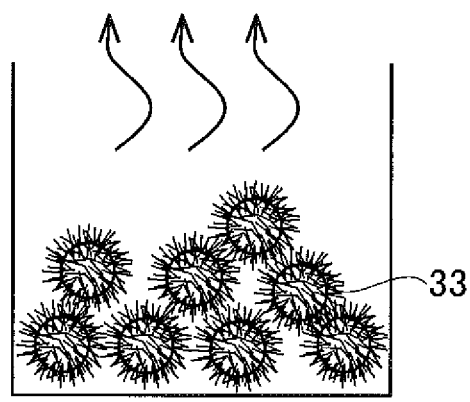
FIG. 3B is schematic view for describing a step of manufacturing the aluminum element wire according to the embodiment of the present invention.

Then, the aluminum powder is added to the CNT dispersion 32 and the resulting mixture is stirred at high speed, whereby the aluminum powder is dispersed. Thereafter, the solvent is removed from the dispersion, thereby obtaining a mixed powder 33 in which the surface of the aluminum powder is almost uniformly covered with the carbon nanotubes as illustrated in FIG. 3B.

Here, in order to almost uniformly cover the surface of the aluminum powder with the carbon nanotubes and to allow the carbon nanotubes to be in the form of a net, the dispersion solvent is preferably volatilized at a rate faster than the aggregation or sedimentation rate of the carbon nanotubes. Accordingly, it is preferable that the aluminum powder is added to the CNT dispersion 32 and the resulting mixture is stirred, and then the solvent is removed using a rotary evaporator.

Figure 4:
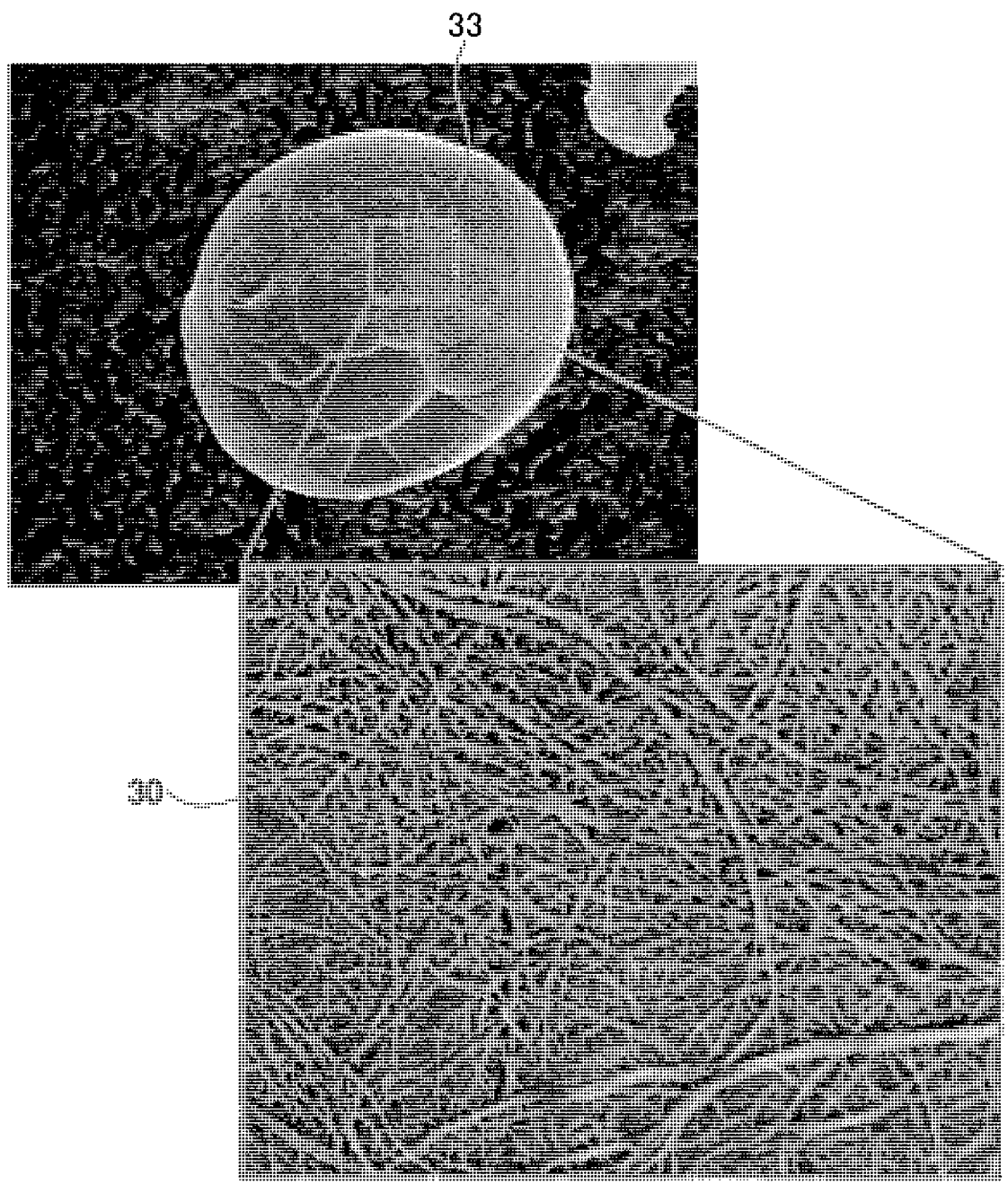
FIG. 4 is a view illustrating a result when a mixed powder containing an aluminum powder and carbon nanotubes is observed with a scanning electron microscope.

FIG. 4 illustrates a result when a mixed powder 33 containing an aluminum powder and carbon nanotubes is observed with a scanning electron microscope. As illustrated in FIG. 4, it is found that the surface of the mixed powder 33 is almost uniformly covered with the carbon nanotubes 30, and further the carbon nanotubes 30 are maintained in the form of a net. As described above, the carbon nanotubes 30 on a surface of an aluminum particle are in the form of a net, thereby obtaining the aluminum element wire 1 in which the carbon nanotubes are highly dispersed in the aluminum base material 10 and the carbon nanotube conductive paths 20 are formed.

(Complexing Step)

In the complexing step, the aluminum powder is complexed with the carbon nanotubes by subjecting the mixed powder 33 obtained in the step of uniformly attaching CHIT to the extrusion processing. Specifically, the complexing step has a green compact forming step and an extrusion processing step.

In the green compact forming step, the mixed powder 33 is pressed by applying a pressure, thereby forming a powder green compact. In the green compact forming step, the mixed powder is pressed so that the gaps between the aluminum particles in the mixed powder become minimum. A method known in public is used as a method of applying a pressure to the mixed powder, and for example, there is used a method of pouring the mixed powder into a cylindrical green compact forming container, and thereafter, pressurizing the mixed powder in this container.

In the obtained powder green compact, the carbon nanotube is usually present in the gaps between the pressed aluminum particles. As the carbon nanotube, one or two or more carbon nanotubes may be present in an extended state, or may be aggregated in a massive form as long as the carbon nanotube is present in the gaps between the aluminum particles.

Figure 5:
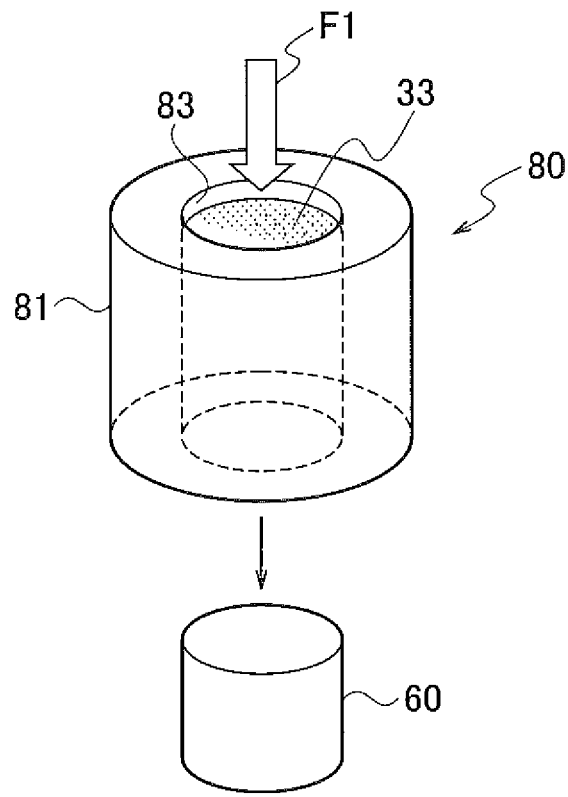
FIG. 5 is a view illustrating an example of a green compact forming step.

A description is made of the step of forming a green compact with reference to the drawings. FIG. 5 is a view illustrating an example of a step of forming a green compact. A green compact forming container 80 illustrated in FIG. 5 is a container for forming a powder green compact 60 by applying a pressure to the mixed powder 33. The green compact forming container 80 includes a cylindrical container body 81 provided with a columnar cavity portion 83 that penetrates the container body 81 in an axial direction.

In the green compact forming step, first, the green compact forming container 80 is mounted on a bottom plate (not shown). At this time, the green compact forming container 80 is mounted so that a gap cannot occur between a bottom surface of the green compact forming container 80 and a surface of the bottom plate. Next, the mixed powder 33 is poured into the cavity portion 83 of the green compact forming container 80 in which a bottom surface side is closed by the bottom plate. Further, a pressure is applied by force of reference symbol F1 to the mixed powder 33 in the cavity portion 83, and the mixed powder 33 is pressed, whereby the powder green compact 60 is molded.

The pressure applied to the mixed powder 33 by the force of reference symbol F1 in the green compact forming step is preferably set equal to or more than a yield stress of the aluminum powder in the mixed powder 33 and equal to or less than a maximum stress thereof. Under such conditions, the powder green compact 60 is molded such that the mixed powder 33 is pressed so that the gaps between the aluminum powder pieces in the mixed powder 33 can become minimum. Here, the yield stress stands for a stress at a boundary point between elastic deformation and plastic deformation. That is, with regard to an aluminum powder, in usual, in a region with a small strain amount, a stress is increased in proportion as the strain amount is increased (elastic deformation); however, the stress stops being increased in proportion as the strain amount is increased when the strain amount exceeds a predetermined strain amount (plastic deformation). This stress at the predetermined strain amount is referred to as the yield stress. Further, the maximum stress stands for a maximum value of the stress at both regions of the elastic deformation and the plastic deformation. The maximum stress of the metal material is usually present in the plastic deformation region.

Processing for applying a pressure to the mixed powder 33 in the green compact forming step is performed at ordinary temperature. Further, a time of applying a pressure to the mixed powder 33 is from 5 seconds to 60 seconds and preferably from 10 seconds to 40 seconds. In this step, the mixed powder 33 does not contain an organic matter such as an elastomer that requires several hours of heat treatment, and there is implemented physical processing for forming the powder green compact 60 by pressing the mixed powder 33 and accordingly, the time of applying a pressure to the mixed powder 33 can be set to an extremely short time.

When a pressure within a predetermined range is applied to the mixed powder 33, the powder green compact 60 is formed of the mixed powder 33 in the cavity portion 83 of the green compact forming container 80. The powder green compact 60 is ejected from the cavity portion 83 of the green compact forming container 80, for example, by being protruded.

In the extrusion processing step, the powder green compact 60 is heated and subjected to the extrusion processing, whereby the aluminum element wire 1 is obtained. A method known in public can be used as a method of implementing the extrusion processing for the powder green compact 60, and for example, there is used a method of pouring the powder green compact 60 into a cylindrical extrusion processing device, and thereafter, heating the powder green compact 60 in this container and implementing the extrusion processing therefor.

Figure 6:
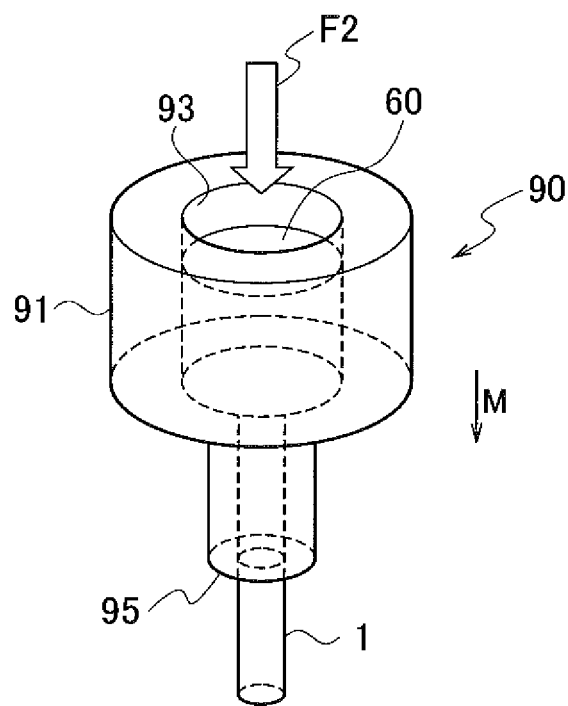
FIG. 6 is a view illustrating an example of an extrusion processing step.

A description is made of the extrusion processing step with reference to the drawings FIG. 6 is a view illustrating an example of an extrusion processing step. An extrusion processing device 90 illustrated in FIG. 6 is a device for forming the aluminum element wire 1 by heating the powder green compact 60 and implementing the extrusion processing therefor. The extrusion processing device 90 includes: a cylindrical device body 91 provided with a columnar cavity portion 93 into which the powder green compact 60 is charged; and a die 95, which is provided on a bottom portion of the device body 91, and ejects an extrusion work piece.

In the extrusion processing step, the powder green compact 60 charged into the cavity portion 93 of the extrusion processing device 90 is heated under vacuum atmosphere, thereafter, is applied with force of reference symbol F2, and is extruded from the die 95 in an extrusion direction M. Note that such an atmosphere in the heating and extrusion processing may be set to an inert gas atmosphere in place of the vacuum atmosphere.

The heating of the powder green compact 60 is performed so that the temperature of the powder green compact 60 is 400° C. or more, preferably from 400° C. to 700° C., more preferably from 400° C. to 660° C., and still more preferably from 400° C. to 650° C. When the temperature of the powder green compact 60 is less than 400° C., it becomes difficult to implement the extrusion processing. Further, when the temperature of the powder green compact 60 exceeds 660° C., aluminum carbide may be generated in the aluminum element wire 1.

Further, the heating of the powder green compact 60 is performed so that a time while the temperature of the powder green compact 60 is within the above temperature range is from 0.3 minutes to 5 minutes, and preferably from 0.5 minutes to 3 minutes. In this step, the powder green compact 60 does not contain an organic matter such as an elastomer that requires several hours of heat treatment, and the aluminum element wire 1 obtained in this step does not have the cellulation structure, either. Therefore, in this step, such a heating time of the powder green compact 60 can be set to an extremely short time.

The strain rate of the heated powder green compact 60 at the extrusion processing time is from $0.1\ s^{-1}$ to $100\ s^{-1}$ and preferably from $0.3\ s^{-1}$ to $3\ s^{-1}$. When the strain rate is within this range, the obtained aluminum element wire 1 becomes one provided with the above structure and characteristics.

An extrusion ratio at the extrusion processing time is preferably 4 or more. When the extrusion ratio is less than 4, sintering of the powder green compact 60 may become insufficient. Here, the extrusion ratio stands for a ratio of a cross-sectional area of the transverse cross section of the powder green compact 60 with respect to a cross-sectional area of the transverse cross section of the aluminum element wire 1 that is an extrusion material.

Figure 7:
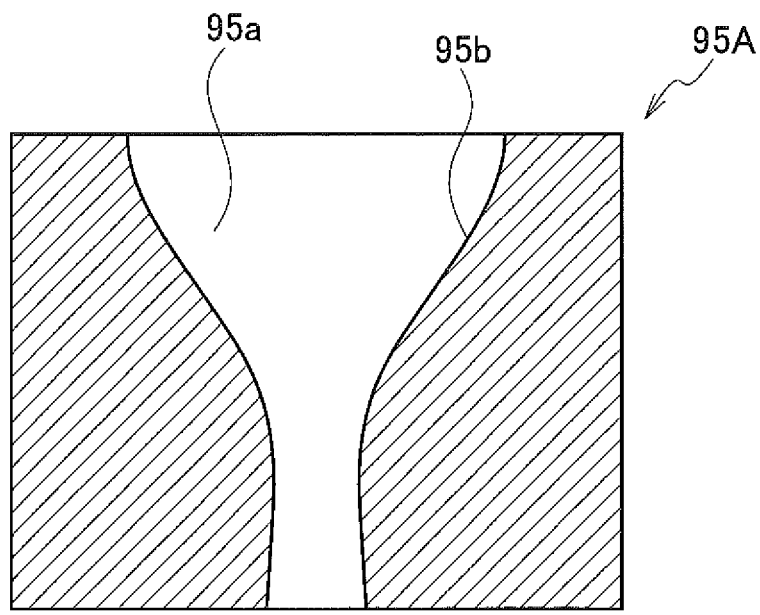
FIG. 7 is a cross-sectional view illustrating an example of a die to be used in the extrusion processing step.
Figure 8:
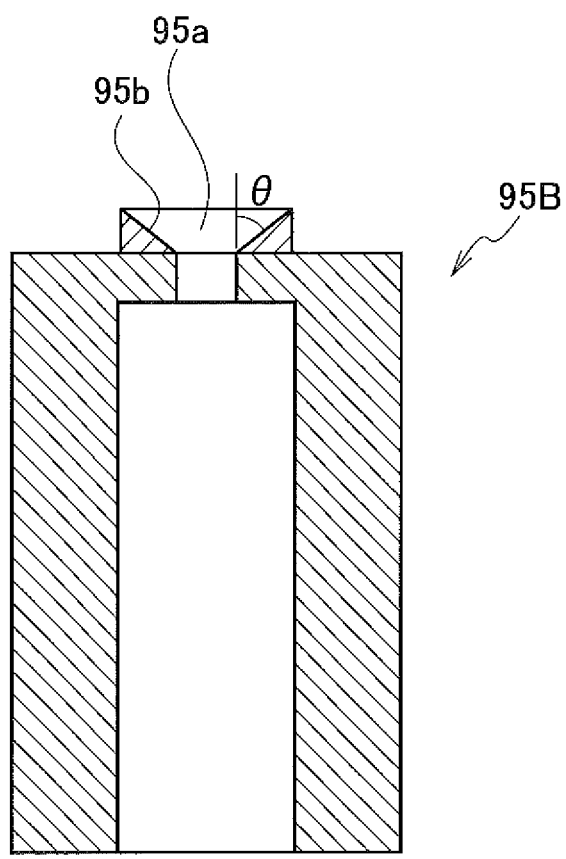
FIG. 8 is a cross-sectional view illustrating another example of the die to be used in the extrusion processing step.

Here, in order to allow the carbon nanotubes in the aluminum base material 10 to be oriented along the longitudinal direction L, it is preferable to form a processing portion of the powder green compact 60 in the die 95 to have a streamline shape or to have an angle of less than 90°. Specifically, it is preferable to use dies 95A and 95B as illustrated in FIG. 7 and FIG. 8. Each of the dies 95A and 95E has a hollow processing portion 95*a*. The powder green compact 60 is extruded downward from the top of the processing portion 95*a*, thereby obtaining the aluminum element wire 1.

In the die 95A illustrated in FIG. 7, an inner surface 95*b*, which forms the processing portion 95*a*, is preferably streamlined in order to reduce the diameter along the extrusion direction continuously. Further, in the die 95B illustrated in FIG. 8, the inner surface 95*b* which composes the processing portion 95*a* preferably has a constant gradient when an angle 0 made by the extrusion direction is 90°. The dies 95A and 95B are used, whereby the diameter of the powder green compact 60 is gradually reduced along the inner surface 95*b*. Thus, it is possible to allow the carbon nanotubes in the aluminum base material 10 to be oriented along the longitudinal direction L.

The method of manufacturing an aluminum element wire according to this embodiment can produce the aluminum element wire, which has high electrical conductivity and a small compounding amount of the carbon nanotube, in a short time. Note that a reason why the electrical conductivity of the aluminum element wire 1 is increased is considered to be because, since the aluminum element wire 1 does not have the cellulation structure, it is not necessary to use an elastomer in the event of the production of the aluminum element wire 1, and the residue generated by the vaporization of the elastomer is not present. Further, a reason why the aluminum element wire 1 can be produced in a short time is because a vaporization operation of an elastomer is unnecessary, and the aluminum element wire 1 can be produced in approximately 2 minutes even if the green compact forming step and the extrusion processing step are included therein.

[Electrical Wire and Wire Harness]

Figure 9:
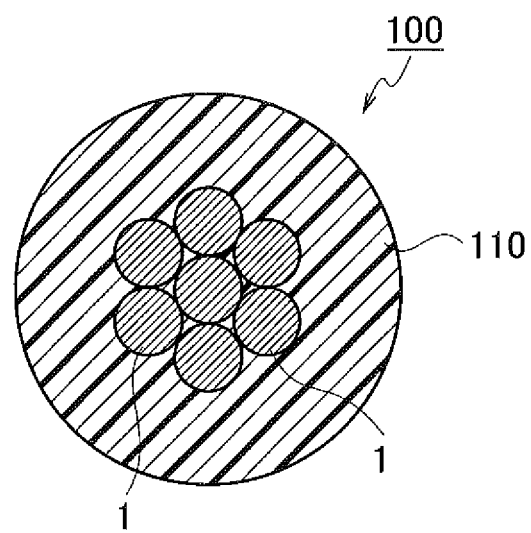
FIG. 9 is a schematic cross-sectional view illustrating an example of an electrical wire according to an embodiment of the present invention.

Subsequently, the electrical wire according to the embodiment will be described. As illustrated in FIG. 9, an electrical wire 100 according to the embodiment includes the aluminum element wire 1 and a coating material 110 for covering the peripheral edge of the aluminum element wire 1.

In the electrical wire 100 of this embodiment, a solid wire composed of an aluminum element, wire 1 may be used as a conductor, or a twisted wire composed by a plurality of the twisted aluminum element wires 1 may be used as the conductor. As to the twisted wire, any of the following twisted wires may be used: a concentric twisted wire in which element wires are concentrically twisted around of a core of one or several element wires; an assembling twisted wire in which a plurality of element wires is collectively twisted in the same direction; and a complex twisted wire in which a plurality of assembling twisted wires is concentrically twisted.

As long as the coating material 110, which covers the outer periphery of the electrical wire 100, can ensure electrical insulation with respect to the electrical wire 100, the material and thickness thereof are not particularly limited. As the coating material 110, an electrically insulating resin such as an olefin resin such as cross-linked polyethylene or polypropylene, or vinyl chloride may be arbitrarily used. Specific examples of the resin material composing the coating material 110 to be used include vinyl chloride, heat-resistant vinyl chloride, cross-linked vinyl chloride, polyethylene, cross-linked polyethylene, polyethylene foam, cross-linked polyethylene foam, chlorinated polyethylene, polypropylene, polyamide (nylon), polyvinylidene fluoride, ethylene-tetrafluoroethylene copolymer, tetrafluoroethylene-hexafluoropropylene copolymer, tetrafluoroethylene, perfluoroalkoxyalkane, natural rubber, polychloroprene rubber, butyl rubber, ethylene propylene rubber, chlorosulfonated polyethylene rubber, and silicone rubber. These materials may be used singly, or in combination of two or more kinds thereof.

It is preferable that the coating material 110 has a volume resistivity of $10^9 \Omega \cdot$mm or more. Under such conditions, it is possible to effectively suppress a short-circuit between the electrical wires. Note that the volume resistivity of the coating material 110 can be measured in accordance with Japanese Industrial Standards: JIB, C3005. Further, the tensile strength of the coating material 110 is preferably from 10.3 MPa to 15.7 MPa and the extension is preferably from 125% to 150%. Under such conditions, the durability of the coating material 110 is increased and thus the insulation can be ensured for a long period.

The wire harness of the embodiment has the above electrical wire. As described above, since the electrical wire of this embodiment is excellent in strength and conductive properties, it can be preferably used for the wire harness for automobiles to which high strength, durability, and conductive properties are required. As long as the conductive properties of the aluminum element wire 1 in the electrical wire is not impaired, the aluminum element wire 1 may be connected to a connector, a terminal, an electronic device or an accessory component. The method of connecting the aluminum element wire 1 to the terminal or the like is not particularly limited, and various kinds of connecting and bonding methods known in public may be used. Further, the aluminum element wire 1 may be connected to the terminal or the like using a bonding agent.

As described above, the electrical wire 100 of the embodiment includes the aluminum element wire 1 which has the aluminum base material 10 and the carbon nano tubes dispersed in the aluminum base material 10. The aluminum element wire 1 has an electrical conductivity of 62% IACS or more and a tensile strength of 130 MPa or more. Further, the aluminum base material 10 is preferably a polycrystal which has a plurality of aluminum crystal grains. Preferably, in the transverse cross section of the aluminum base material 10, a carbon nanotube conductive path 20, which forms a conductive path P allowing electricity to conduct therethrough in a longitudinal direction L of the aluminum element wire 1 by being present in a part of grain boundaries 15 between the plurality of aluminum crystal grains 11 and being present along the longitudinal direction L of the aluminum element wire 1, is formed in the aluminum base material 10. In the aluminum element wire 1, the carbon nanotubes are complexed, and accordingly, the tensile strength can be largely improved by a dispersion-strengthening mechanism. Further, the carbon nanotube conductive path 20 forms the conductive path P along the longitudinal direction L of the aluminum element wire 1, and accordingly, the conductive properties of the aluminum element wire 1 can be increased.

EXAMPLE

Hereinafter, the present invention will be described in detail with reference to Examples and Comparative examples, however the present invention is not limited thereto.

Example 1

First, carbon nanotubes having a diameter of about 40 nm and an average length of about 5 μm were stirred. In N,N-dimethylformamide while being irradiate with ultrasonic waves and thus a CNT dispersion was obtained. Next, to the CNT dispersion, an aluminum powder with a purity of 99.9% and an average particle diameter D50 of 50 μm was added, and the resulting mixture was stirred at high speed. At this time, the amount of the materials to be mixed was adjusted so that the content of carbon nanotubes with respect to the aluminum powder was 0.10 mass %. Thereafter, N,N-dimethylformamide was volatilized using a rotary evaporator, thereby preparing a mixed powder containing an aluminum powder and carbon nanotubes.

Then, the mixed powder was poured into the cavity portion 83 of the green compact forming container 80 illustrated in FIG. 5, and a pressure was applied thereto at ordinary temperature (20° C.) for 20 seconds. Note that, the pressure applied to the mixed powder was set equal to or more than a yield stress of the aluminum powder in the mixed powder and equal to or less than a maximum stress thereof. As a result, a powder green compact was formed in the cavity portion 83 of the green compact forming container 80.

To the cavity portion 93 of the extrusion processing device 90 illustrated in FIG. 6, the powder green compact was poured. The temperature of the die 95 was set to 500° C. and maintained in a vacuum atmosphere for about 2 minutes, and then extrusion processing was implemented. In the extrusion processing, the strain rate was 1 s$^{-1}$. Further, the extrusion ratio for extrusion processing was 4. The aluminum element wire (having a diameter of 4 mm) of this example was produced in this manner.

Example 2

An aluminum element wire of this example was produced in the same manner as in Example 1 except that the amount of the materials to be mixed was adjusted so that the content of carbon nanotubes with respect to the aluminum powder was 0.50 mass %.

Example 3

An aluminum element wire of this example was produced in the same manner as in Example 1 except that the amount of the materials to be mixed was adjusted so that the content of carbon nanotubes with respect to the aluminum powder was 1.25 mass %.

Comparative Example 1

The same aluminum powder as that of Example 1 was poured into the cavity portion 83 of the green compact forming container 80 illustrated in FIG. 5 and a pressure was applied thereto at ordinary temperature (20° C.) for 20 seconds. Note that, the pressure applied to the aluminum powder was set equal to or more than a yield stress of the aluminum powder in the aluminum powder and equal to or less than a maximum stress thereof. As a result, a powder green compact was formed in the cavity portion 83 of the green compact forming container 80.

An aluminum element wire of this example was produced by subjecting the obtained powder green compact to the extrusion processing in the same manner as in Example 1.

Comparative Example 2

An aluminum element wire of this example was produced by implementing the extrusion processing using JIS A1050-O as aluminum in the same manner as in Comparative Example 1.

Table 1 shows the kind of each of the aluminum powders used in Examples 1 to 3 and Comparative Examples 1 and 2 as well as the content of carbon nano tubes with respect to the aluminum powder.

TABLE 1

|  | Kind of aluminum powder | CNT consistency with respect to Al powder (mass %) | Tensile strength (MPa) | Electrical conductivity (IACS %) |
| --- | --- | --- | --- | --- |
| Example 1 | Al powder (purity: 99.9%) | 0.10 | 130 or more | 64.8 |
| Example 2 | Al powder (purity: 99.9%) | 0.50 | 130 or more | 69.8 |
| Example 3 | Al powder (purity: 99.9%) | 1.25 | 130 or more | 62.1 |
| Comparative Example 1 | Al powder (purity: 99.9%) | 0 | 100 or more | 62 |
| Comparative Example 2 | JIS A1050-O | 0 | 75 or more | 62 |

[Evaluation]
(Microscopic Observation)

Figure 10:
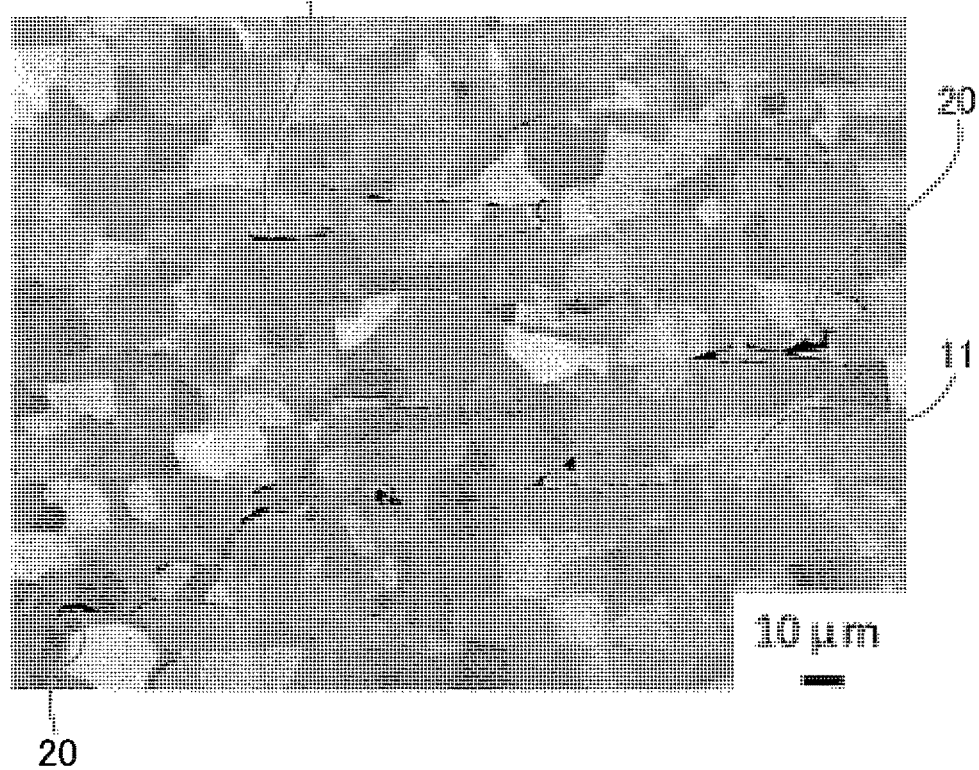
FIG. 10 is a view illustrating a result when a transverse cross section of an aluminum element wire obtained in Example 1 is observed with the scanning electron microscope.
Figure 11:
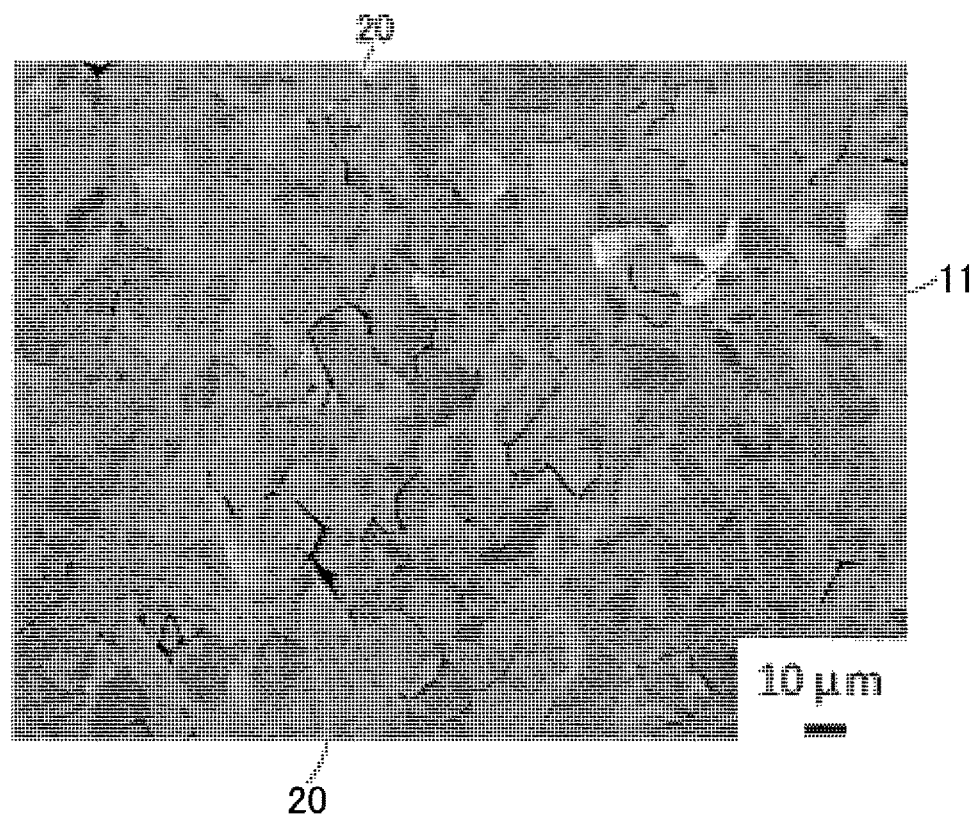
FIG. 11 is a view illustrating a result when a longitudinal cross section of the aluminum element wire obtained in Example 1 is observed with the scanning electron microscope.

The cross section of the aluminum element wire obtained in Example 1 was observed with a scanning electron microscope. FIG. 10 is a view illustrating a result when a transverse cross section of an aluminum element wire (cross section in a direction perpendicular to the longitudinal direction) is observed with the scanning electron microscope. FIG. 11 illustrates a result when a longitudinal cross section of an aluminum element wire (cross section in the longitudinal direction) is observed with the scanning electron microscope. As is apparent from FIG. 10, the carbon nanotube conductive paths 20 are present in a part of grain boundaries between the aluminum crystal grains 11. Further, it is found that the carbon nanotube conductive paths 20 are not present at the whole of the grain boundaries between the aluminum crystal grains 11, but are present in a part of grain boundaries. As is apparent from FIG. 11, the carbon nanotube conductive paths 20 are continuously present along the longitudinal direction L of the aluminum element wire. As is apparent from FIG. 10 and FIG. 11, in both the longitudinal and transverse cross sections of the aluminum element wire, the thickness of the carbon nanotube conductive paths 20 is from 2 nm to 10 μm.

As is apparent from FIG. 10 and FIG. 11, in both the longitudinal and transverse cross sections of the aluminum element wire, the average crystal grain size of the plurality of aluminum crystal grains 11 composing the aluminum base material is 30 µm or less.

Note that, FIG. 4 shows scanning electron microscope photographs of the mixed powder obtained in Example 1 containing the aluminum powder and carbon nanotubes. FIG. 4 shows photograph of the mixed powder and an enlarged photograph of the surface of the mixed powder. As illustrated in FIG. 4, with regard to the mixed powder, the surface of the aluminum powder is uniformly covered with the carbon nanotubes in the form of a net.

(Measurement of Electrical Conductivity)

The electrical conductivity of each of the aluminum element wires produced in Examples 1 to and Comparative Examples 1 and 2 was measured in accordance with JIS C2525 Table 1 shows the measurement results of these Examples. As shown in Table 1, the aluminum element wires of Examples 1 to 3 are more excellent in electrical conductivity than the aluminum element wire of Comparative Example 1 to which the carbon nanotubes were not added and the aluminum element wire of Comparative Example 2 which was composed of JIS A1050-O.

Figure 12:
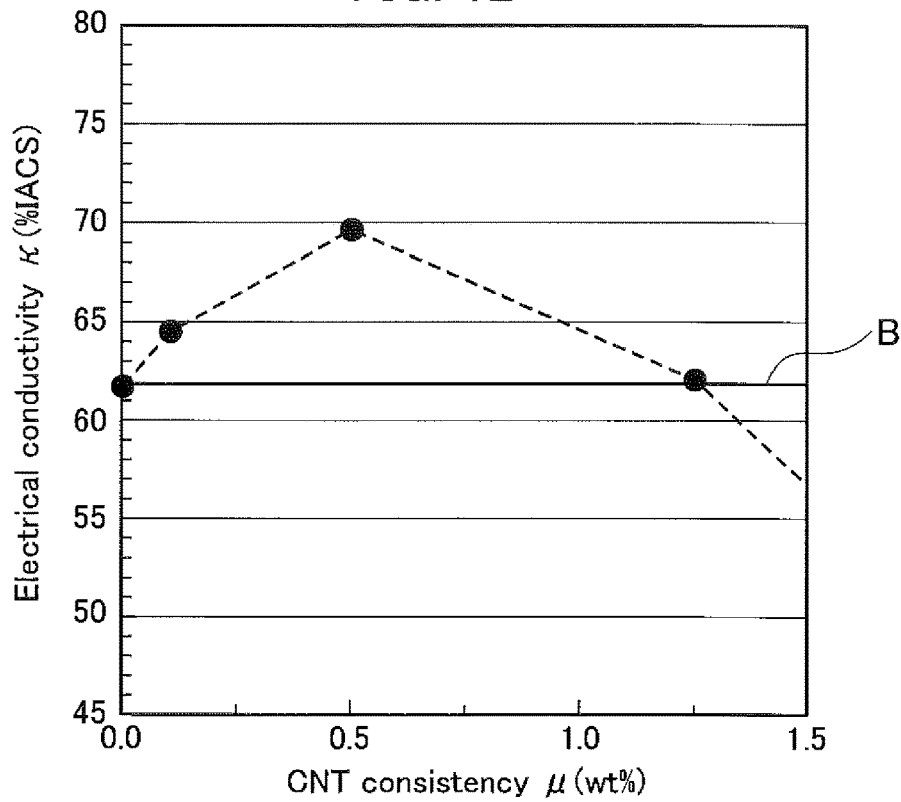
FIG. 12 is a graph showing a relationship between electrical conductivity and CNT consistency regarding aluminum element wires obtained in Examples 1 to 3 and Comparative Examples 1 and 2.

Further, the graph of FIG. 12 shows a relationship a relationship between electrical conductivity and CNT consistency regarding the aluminum element wire obtained in Examples 1 to 3 and Comparative Examples 1 and 2. Note that a symbol E in FIG. 12 represents the electrical conductivity of the aluminum element wire of Comparative Example 2. As illustrated in FIG. 12, when the content of carbon nanotubes with respect to the aluminum powder is in a range of from 0.1 mass % to 1.25 mass %, the electrical conductivity is improved, compared to that of the pure aluminum of Comparative Example 1. When the content is in a range of from 0.25 mass % to 0.75 mass %, the electrical conductivity is further improved, compared to that of the pure aluminum of Comparative Example 1.

(Measurement of Tensile Strength)

The tensile strength of each of the aluminum element wires produced in Examples 1 to 3 and Comparative Examples 1 and 2 was measured in accordance with JIS 72241. Table 1 shows the measurement results of these Examples. As shown in Table 1, the aluminum element wires of Examples 1 to 3 are more excellent in tensile strength than the aluminum element wire of Comparative Example 1 to which the carbon nanotubes were not added and the aluminum element wire of Comparative Example 2 which was composed of JIB A1050-O.

Figure 13:
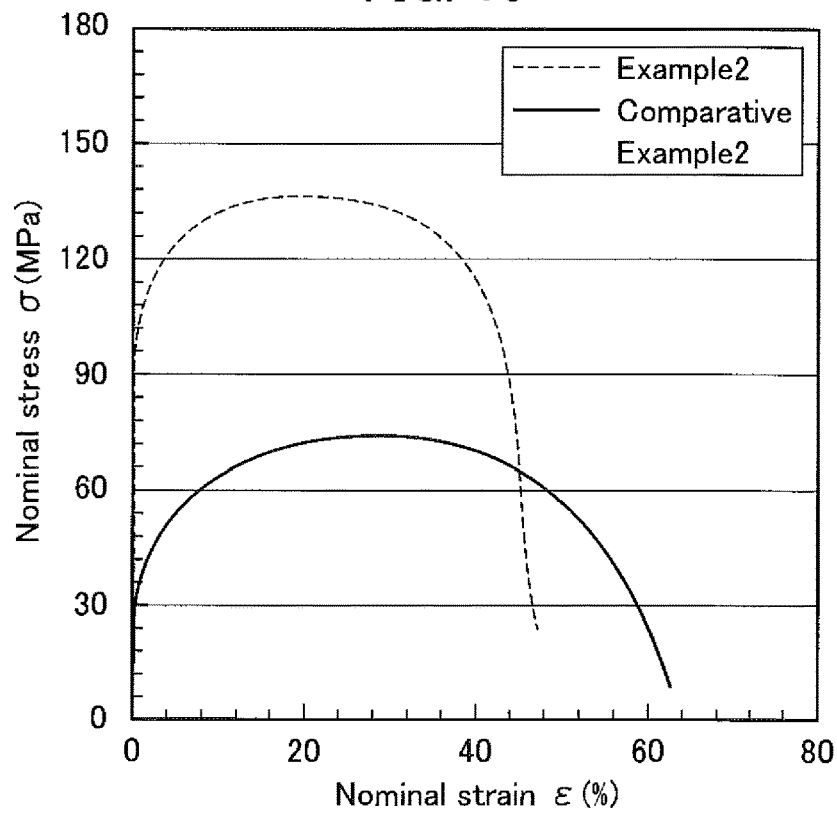
FIG. 13 is a graph showing a relationship between Nominal stress and Nominal strain in the aluminum element wires of Example 2 and Comparative Example 2.

In the graph of FIG. 13, there is shown a relationship between Nominal stress and Nominal strain in the aluminum element wires of Example 2 and Comparative Example 2. As illustrated in FIG. 13, the Nominal stress of the aluminum element wire of Example 2 is largely improved, compared to that of Comparative Example 2. It is found that the addition of carbon nanotubes results in a favorable tensile strength.

As described above, in the aluminum element wire according to each of the Examples, highly crystalline carbon nanotubes are used and the amount of carbon nanotubes to be added is controlled, whereby it is possible to allow the electrical conductivity of the aluminum element wire to largely exceed that of the pure aluminum. Further, the carbon nanotubes are dispersed in aluminum, whereby it is possible to induce a dispersion-strengthening mechanism and improve the conductive properties and strength of the aluminum element wire. Such material characteristics of the aluminum element wire are considered to be due to the fact that the carbon nanotubes are oriented along the longitudinal direction L of the element wire.

While the present invention has been described above by reference to the examples and the comparative examples, the present invention is not intended to be limited to the descriptions thereof, and various modifications will be apparent to those skilled in the art within the scope of the present invention.

The invention claimed is:

1. An electrical wire comprising: an aluminum element wire having an aluminum base material and carbon nanotubes dispersed in the aluminum base material, wherein the aluminum element wire has an electrical conductivity of 62% IACS or more and a tensile strength of 130 MPa or more, wherein the aluminum base material comprises a polycrystal having a plurality of aluminum crystal grains; and a plurality of carbon nanotube conductive paths composed of the carbon nanotubes, which forms a conductive path allowing electricity to conduct therethrough in a longitudinal direction of the aluminum element wire by being present in a part of grain boundaries between the plurality of aluminum crystal grains in a transverse cross section of the aluminum base material, and is present along the longitudinal direction of the aluminum element wire, wherein the plurality of carbon nanotube conductive paths is formed in the aluminum base material, wherein each of the plurality of the carbon nanotube conductive paths is spaced apart from one another in the transverse cross section of the aluminum base material wherein the aluminum base material is disposed in at least a part of a surface of the aluminum element wire, wherein the carbon nanotube conductive paths formed at grain boundaries of the plurality of aluminum crystal grains have a thickness of from 2 nm to 10 µm, wherein an average crystal grain size of the plurality of aluminum crystal grains is from 1 µm to 50 µm in both a longitudinal and transverse cross sections of the aluminum element wire from both a longitudinal cross-sectional view and a transverse cross sectional view of the aluminum element wire, wherein an intensity ratio of G band to D band in a Raman spectrum of the carbon nanotube comprises 5 or more; and wherein the plurality of carbon nanotube conductive paths is present continuously in the longitudinal direction of the aluminum element wire by being adjacent to one another in the longitudinal direction so as to contact one another.

2. The electrical wire according to claim 1, wherein, in the aluminum element wire, a content of the carbon nanotubes with respect to the aluminum base material is from 0.1 mass % to 1.25 mass %.

3. The electrical wire according to claim 1, further comprising a coating material for covering the peripheral edge of the aluminum element wire, wherein the coating material has a volume resistivity of $10^9 \Omega \cdot mm$ or more.

4. The electrical wire according to claim 3, the aluminum element wire directly contacts with the coating material.

5. A wire harness comprising the electrical wire according to claim 1.

6. An electrical wire comprising: a plurality of aluminum element wires having an aluminum base material and carbon nanotubes dispersed in the aluminum base material, wherein each of the plurality of the aluminum element wires has an electrical conductivity of 62% IACS or more and a tensile strength of 130 MPa or more, wherein the aluminum base material comprises a polycrystal having a plurality of aluminum crystal grains; and a plurality of carbon nanotube conductive paths composed of the carbon nanotubes, which forms a conductive path allowing electricity to conduct therethrough in a longitudinal direction of each of the plurality of the aluminum element wires by being present in a part of grain boundaries between the plurality of aluminum crystal grains in a transverse cross section of the aluminum base material, is being present along the longitudinal direction of each of the plurality of the aluminum element wires, wherein the plurality of carbon nanotube conductive paths is formed in the aluminum base material, wherein each of the plurality of the carbon nanotube conductive paths is spaced apart from one another in the transverse cross section of the aluminum base material, wherein each of the plurality of the aluminum element wires directly contacts with an adjacent aluminum element wire of the plurality of the aluminum element wires, wherein the carbon nanotube conductive paths formed at grain boundaries of the plurality of aluminum crystal grains have a thickness of from 2 nm to 10 µm, wherein an average crystal grain size of the plurality of aluminum crystal grains is from 1 µm to 50 µm in both a longitudinal and transverse cross sections of the aluminum element wire from both a longitudinal cross-sectional view and a transverse cross sectional view of the aluminum element wire;

wherein an intensity ratio of G band to D band in a Raman spectrum of the carbon nanotube comprises 5 or more; and wherein the plurality of carbon nanotube conductive paths is present continuously in the longitudinal direction of the aluminum element wire by being adjacent to one another in the longitudinal direction so as to contact one another.

* * * * *